(No Model.) 3 Sheets—Sheet 1.

C. SCHMIDT.
AUTOMATIC WEIGHING SCALE FOR GRANULATED AND PULVERIZED SUBSTANCES.

No. 583,390. Patented May 25, 1897.

WITNESSES:
George W. Jackel
H. Willard Griffiths.

INVENTOR
Carl Schmidt
By Grieve & Jaegner
ATTORNEYS.

(No Model.) 3 Sheets—Sheet 2.
C. SCHMIDT.
AUTOMATIC WEIGHING SCALE FOR GRANULATED AND PULVERIZED SUBSTANCES.

No. 583,390. Patented May 25, 1897.

WITNESSES: INVENTOR
Carl Schmidt
By Attorneys (No Model.) 3 Sheets—Sheet 3.
C. SCHMIDT.
AUTOMATIC WEIGHING SCALE FOR GRANULATED AND PULVERIZED SUBSTANCES.
No. 583,390. Patented May 25, 1897.
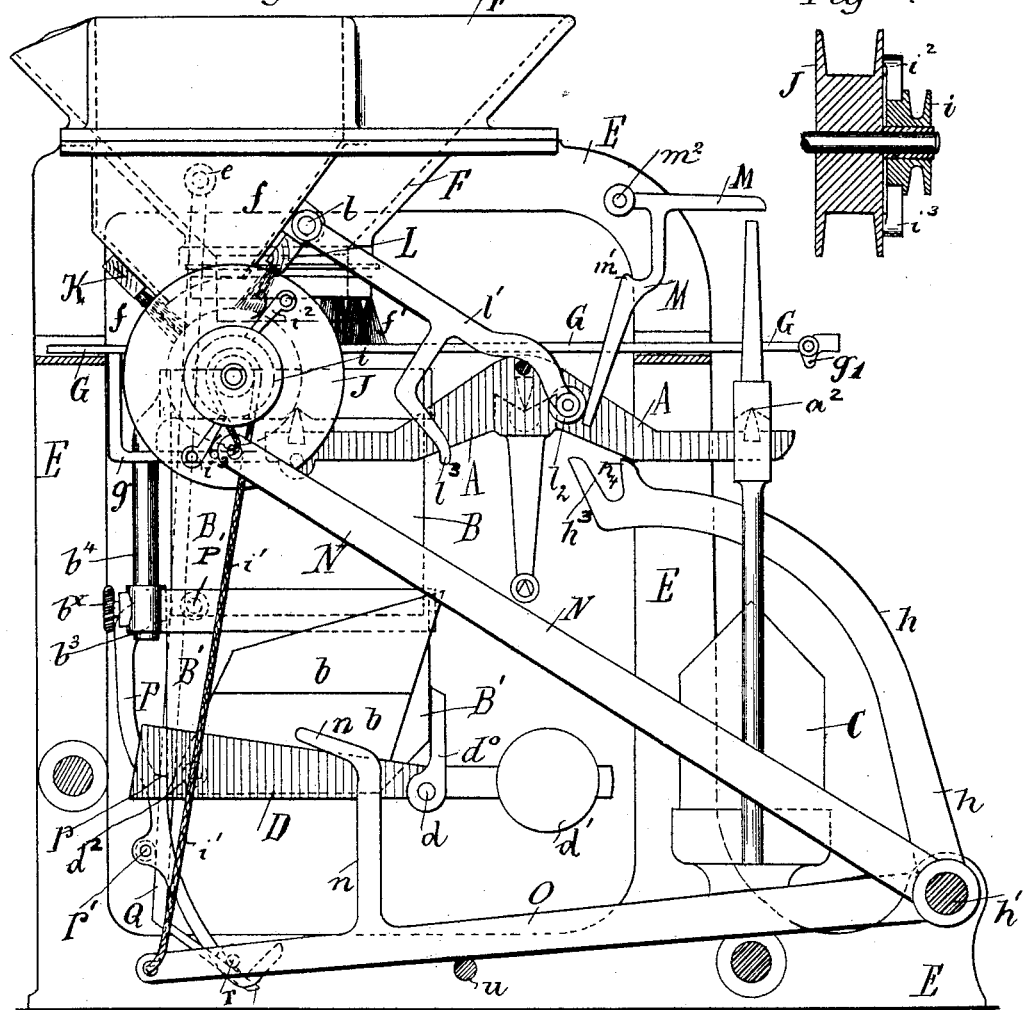
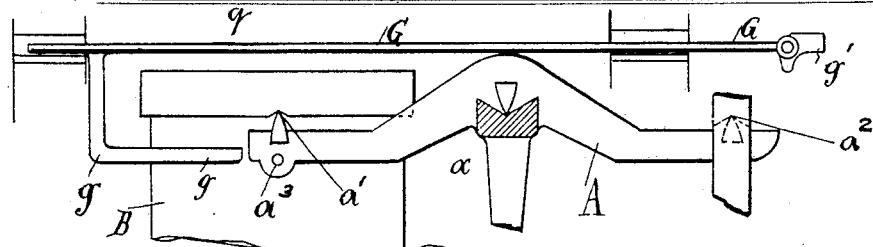
WITNESSES:
Geo. W. Jaekel
INVENTOR
Carl Schmidt
BY
ATTORNEYS.

UNITED STATES PATENT OFFICE.

CARL SCHMIDT, OF BERLIN, GERMANY.

AUTOMATIC WEIGHING-SCALE FOR GRANULATED AND PULVERIZED SUBSTANCES.

SPECIFICATION forming part of Letters Patent No. 583,390, dated May 25, 1897.

Application filed January 31, 1895. Serial No. 536,775. (No model.) Patented in Germany August 30, 1894, No. 80,093; in France October 17, 1894, No. 242,253; in England January 23, 1895, No. 1,601; in Austria June 7, 1895, No. 45/2,046, and in Hungary November 23, 1895, No. 4,506.

*To all whom it may concern:*

Be it known that I, CARL SCHMIDT, a citizen of Germany, residing in Berlin, in the Kingdom of Prussia, in the Empire of Germany, have invented certain new and useful Improvements in Automatic Weighing-Scales for Granulated and Pulverized Substances, (for which Letters Patent have been granted in Germany, No. 80,093, dated August 30, 1894; in France, No. 242,253, dated October 17, 1894; in Austria, No. 45/2,046, dated June 7, 1895; in Hungary, No. 4,506, dated November 23, 1895, and in England, No. 1,601, dated January 23, 1895,) of which the following is a specification.

The object of this invention is an improved machine for automatically weighing predetermined quantities of granular or pulverized substances in which by a novel and improved construction by means of a lever operated by hand and suitable connecting mechanisms the operative parts of the machine are set in such a manner that an automatic supply of the material into the scale-pan takes place, the accurate weighing of the quantity required is produced by an auxiliary feed device, and after the weighing off of the quantity the automatic opening of the discharge-gate closing the bottom of the scale-pan takes place, after which all the parts are returned into their initial positions ready for the next weighing action, said parts being so arranged that during the alternating functioning of the different mechanisms no back action can take place either on the inflowing material to be weighed or on the outflowing material after the same has been weighed.

Figure 1:
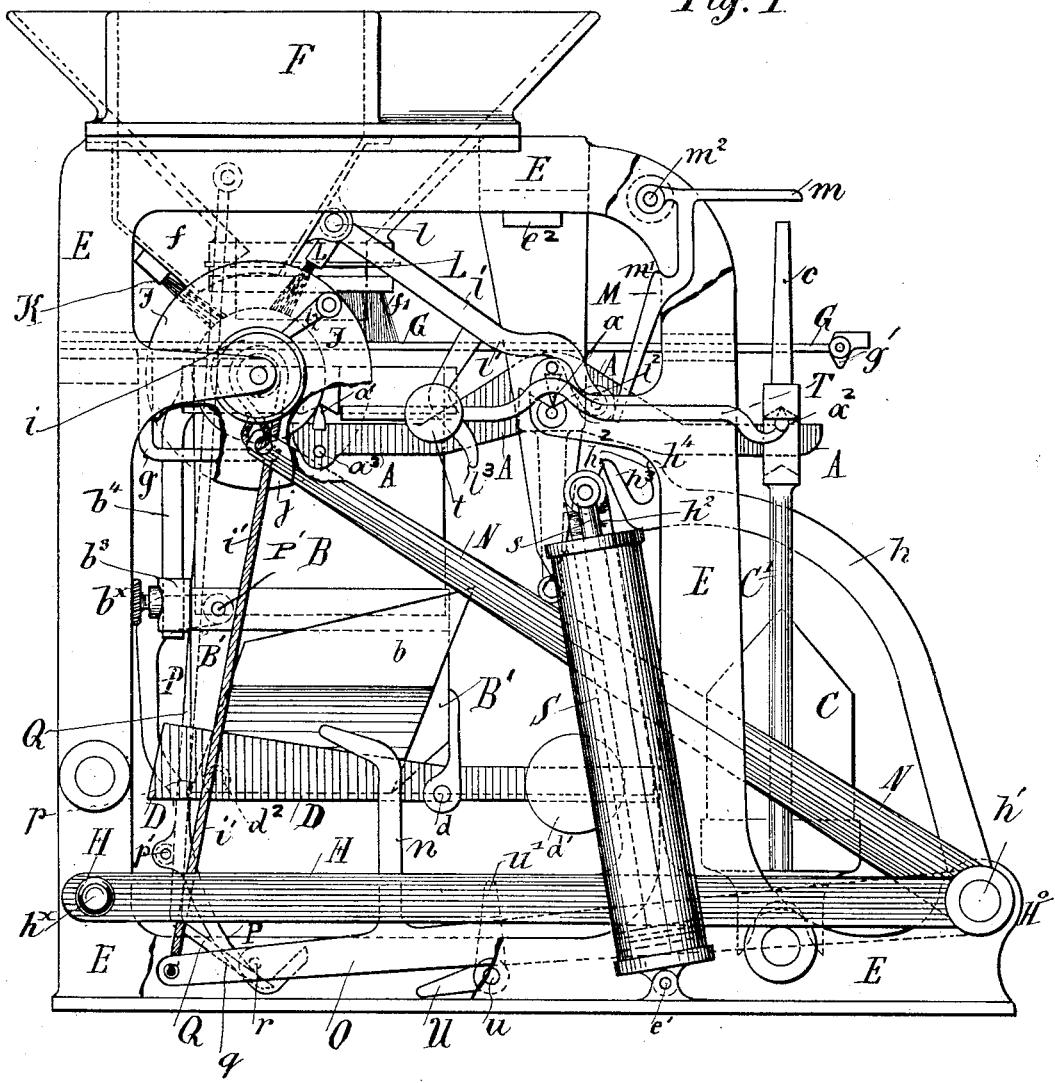
Figure 2:
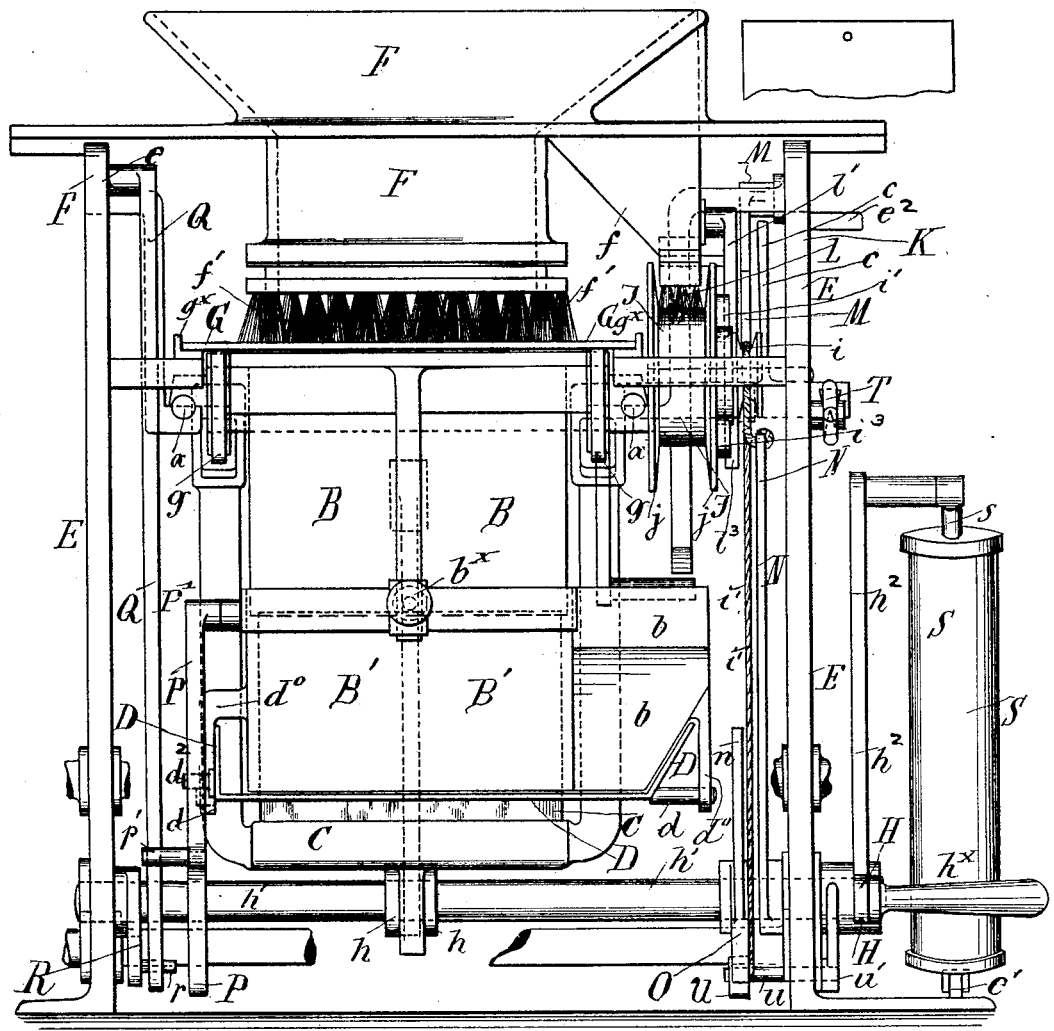

In the accompanying drawings, Figure 1 represents a side elevation of my improved automatic weighing-machine in which parts are broken away and in which the machine is shown immediately before the commencement of the outflowing of the material to be weighed. Fig. 2 is a front elevation of the machine in which also some of the parts are broken away. Fig. 3 is a vertical longitudinal section, partly in elevation. Fig. 4 is a detail view of the scale-beam and other adjacent parts, and Fig. 5 is a detail sectional view of the feed-roller and pulley.

Similar letters of reference indicate corresponding parts.

Referring to the drawings, A represents the weighing-beam, by which on knife-edge $a'$, supported in bearings of frame E, is suspended the scale-pan B B' and on knife-edge $a^2$ the counterbalancing-weight C. The knife-edges $a'$ $a^2$ are located in one straight line with the central knife-edge or fulcrum $a$, on which the weighing-beam oscillates. With the scale-pan B B' is connected a side pocket $b$, which are both closed by a bottom discharge-gate D, that turns on a pivot $d$, turning in bearings of hangers $d^0$ on the scale-pan and which is provided with a counterbalancing-weight $d'$. Above the scale-pan B B' is arranged on the stationary supporting-frame E a supply-hopper F, with a small auxiliary side hopper $f$, which latter serves for supplying the side pocket $b$. Between the outlet-opening of the hopper F and the upper end of the scale-pan B is arranged a flat horizontal slide-plate G, which is guided in suitable ways $g^\times$ of the frame E and which is operated by the hand-lever connection H $h$.

The lower edges of the supply-hopper F are provided with brushes $f'$, which bear on the upper side of the horizontal slide-plate G. To the under side of the slide-plate G are attached angular latches $g$, which serve for the purpose of locking the weighing-beam when the slide-plate G has been moved beyond the supply-opening of the hopper F, said angular latches engaging a pin $a^3$ on the weighing-beam.

Below the auxiliary supply-hopper $f$ is arranged a feed device which consists of a roller J, which is supported in bearings of the supporting-frame E and which is provided with enlarged disk-shaped heads that form circumferential flanges $j$, by which the outlet-opening of the auxiliary hopper $f$ is closed at two sides, while the third and fourth sides are closed by a stationary brush K, which is attached to the auxiliary hopper $f$, and by an opposite oscillating brush L, which turns in the nature of a valve on a pivot $l$. From the brush L extends nearly at right angles thereto a downwardly-extending arm $l'$, which is provided at its outer end with an antifriction-roller $l^2$ and which is further provided at some distance from the end with a downwardly-extending finger $l^3$. The antifriction-roller $l^2$ rests, when the arm $l'$ is in its highest position, on the shoulder $m'$ of an elbow-lever M, which is pivoted to the supporting-frame E at $m^2$. The hand-lever H is pivoted at $h'$ to the lower part of the supporting-frame E, the pivot extending transversely from one side of the frame to the other, as shown in Fig. 2. Besides the upwardly-extending slide-actuating arm $h$ the hand-lever H is provided with the levers O and R, which are located at opposite sides of the frame and rigidly connected to the transverse pivot $h'$, so that they participate in the motion of the lever H. The lever O is provided with an upwardly-extending arm $n$, which latter forms, by its upper inclined end, contact with the finger $l^3$ of the arm $l'$, whereby the latter is moved in upward direction. The axle of the feed-roller J carries adjacent to the latter a loose pulley $i$, which is provided with a peripheral groove for guiding a cord $i'$, which cord is connected at one end to the outer end of the gravitating lever N, and which is attached at its other end to the outer end of the lever O, as shown in Figs. 1 and 4, said lever holding the cord $i'$ taut by its own weight. The lever N is loose on the pivot or shaft $h'$, so that by its weight it may hold the cord $i'$ tense and at the same time cause the necessary friction between the cord and the pulley $i$ in turning. At diametrically opposite points on the outer side flange of the feed-roller J are arranged two pawls $i^2 i^3$, which act on the circumference of the loose pulley $i$ and which carry along the feed-roller during the turning of the pulley in one direction, while during the turning of the pulley in the opposite direction the locking action between the pawls and the pulley is discontinued, and the feed-roller is thus permitted to remain at rest. The lever O has two different functions to fill—first, to cause the movement of the pulley, and, second, by means of the arm $n$ to move arm $l'$ upon the nose $m'$ of the elbow-lever M.

The carrying along of the feed-roller J can also be accomplished by other means than by the pawls shown—as, for instance, by means of a gear or chain and sprocket-wheel connection—but in all cases the actuating motion has to be supplied by the automatic downward or return motion of the hand-lever H.

The discharge-gate D is retained in closed position by means of a lever P, which is pivoted at P' to the side wall of the scale-pan B B' and which forms at $p$ a latch, with which a pin $d^2$ of the gate D engages for supporting the gate. To the top of the frame E is pivoted at $e$ a downwardly-extending arm Q, the lower end $q$ of which is bent at a suitable inclination, as shown clearly in Fig. 1. The lever R, which is applied to the transverse pivot-rod $h$, serves to engage by its pin $r$ the lower inclined end $q$ of the lever Q and to move the same at the end of its downward motion out of its initial position, so as to act on a pin $p'$ on the lever P, whereby the latter is moved away from the receiving-chamber B B', so that its latch $p$ releases the pin $d^2$ of the gate D. At one side of the supporting-frame E and at the lower part of the same is pivoted at $e'$ the cylinder S of a pneumatic brake, the piston-rod $s$ of which is connected with an arm $h^2$ of the hand-lever H, which is shown in dotted lines back of the cylinder S in Fig. 1 and in full lines alongside of the same in Fig. 2. For the purpose of adjusting small inaccuracies in the weighing-machine and producing the reliable and uniform functioning of the same there is fulcrumed to the frame E an auxiliary regulating-arm T, which carries at one end a sliding weight $t$, while its outer end is connected with the shoulder on the suspension-rod C' of the counterbalancing-weight C. For permitting the testing of the uniform quantities to be weighed a toe-piece U is fulcrumed at $u$ to the lower part of the supporting-frame E, which toe-piece is provided with a small hand-lever $u'$, so that it can be moved in upward direction against lever O and thereby the lever R arrested near the lower end of its downward motion and prevented from releasing the latch of the gate D—in other words, for preventing thereby the discharge of the scale-pan B B'. As it is necessary that the quantity of material supplied to the scale-pan B B' corresponds to the counterbalancing-weight C the size of the scale-pan B B' must be adjusted to the specific gravity of the material to be weighed. For this purpose the scale-pan is rendered adjustable, as shown in Fig. 2, by making the same of two parts B and B', which can be telescoped one into the other, so that the size of the chamber therein can be made smaller or larger, after which the sections B B' are firmly connected by a suitable clamping-screw $b^\times$, which passes through a sleeve $b^5$ of the lower part B' and engages a guide-rod $b^4$, projecting from the upper part B.

The operation of my improved weighing-machine is as follows: The material to be weighed is supplied to the hopper F from a suitable bin or other receptacle. The lever H is moved by hand in upward direction by taking hold of its handle $h^\times$ until it abuts against the stationary lug $e^2$, projecting laterally from the upper part of the frame E, as shown in Fig. 2. During the upward motion of the hand-lever H the lever $h$, which is provided with a finger $h^3$ at its outer end, is likewise oscillated and thereby the finger $h^3$ placed in engagement with the nose $g'$ on the outer end of the horizontally-guided slide-plate G, so as to move the same in outward direction and open thereby the outlet-opening of the hopper F. The material to be weighed flows out from the hopper into the scale-pan B B' until the same is filled and the gradual retarding of the downward motion of the scale-pan takes place. As the outlet-opening of the hopper F is smaller than the mouth of the scale-pan B B' an outward spreading of the material from the lower end of the hopper toward the upper part of the scale-pan takes place. The outlet-opening of the hopper F is, however, large enough to permit the quick filling of the scale-pan B B' until the material arrives near the upper rim of the same, so that the hand-lever H can be released by the attendant immediately after contact with the lug $e^2$ has been made. The hand-lever H is oscillated by gravity in downward direction, during which motion the finger $h^4$ at the upper end of the curved arm $h$ imparts to the slide-plate G a return motion, by which the same cuts through the material, which is arrested between the outlet-opening of the hopper and the mouth of the scale-pan B B' and shuts off the outlet-opening of the hopper from the scale-pan B B'. During the backward motion of the slide-plate G through the material between the outlet-opening of the hopper and the mouth of the scale-pan B B' the material is gradually cut off, so as to fill the space at the upper part of the scale-pan and distribute thereby the piled-up material uniformly over the mouth of said scale-pan. The capacity of the scale-pan B B' is so proportioned that the quantity of the material supplied to the same corresponds nearly to the counterbalancing-weight C. To bring about the accurate counterbalancing of the contents of the scale-pan, the auxiliary feed device is automatically started and thereby a small auxiliary supply of material delivered into the scale-pan B B'. This is accomplished as during the upward motion of the hand-lever H the arm $n$ strikes the finger $l^3$ and the arm $l'$ is raised into its highest position, in which it is retained by the nose $m'$ of the elbow-lever M. By the lifting motion imparted to the arm $l'$ the brush L is oscillated, so that an opening is produced between the auxiliary feed-hopper $f$ and the feed-roller J, through which the material in the auxiliary hopper $f$ is conducted into the side pocket $b$, which, however, takes place only from the moment when the lever O, which is lowered with the returning hand-lever H, causes, by the cord $i'$ and the pulley $i$, the turning of the feed-roller J. As soon as by the supply of the auxiliary feed to the pocket $b$ the counterbalancing of the weight C takes place the upwardly-extending pin $c$, applied to the suspension-rod C' of the counterbalancing-weight C, engages the outwardly-extending arm $m$ of the elbow-lever M and releases thereby the arm $l'$ from the nose $m'$ on the lower arm of the lever M, so that thereby the brush L is returned into lowermost position and into contact with the feed-roller J to prevent the further supply of material. As soon as the supply of the material to the side pocket $b$ is completed the discharge-gate D is released by the action of the downward motion of the arm R (which is returned with the descending hand-lever H) upon the pendent lever Q, which releases the latch-lever P and permits thereby the dropping of the gate D, so that the material in the scale-pan B B' and the pocket $b$ can flow out freely over the gate D and be conducted to the place where the same is to be stored. As soon as the scale-pan B B' and pocket $b$ are empty the discharge-gate D closes itself automatically by the action of its counterweight $d'$.

During the supply of the material to the scale-pan B B' the latch $g$ on the horizontal slide G engages the pin $a^3$ on the weighing-beam A and arrests thereby the latter during the time required for the filling of the scale-pan B B'. This intermittent locking of the weighing-beam is provided so that by the momentum of the material supplied to the scale-pan and the pocket $b$ the auxiliary supply is not interrupted before it is entirely completed. Only when the slide-plate G closes the outlet-opening of the hopper F the weighing-beam can play freely and complete, in connection with the extra feed, the accurate weighing operation. The pneumatic brake, which is connected by the arm $h^2$ with the lever H, is arranged for the purpose of securing the steady supply of the auxiliary feed and to likewise produce the slight retarding of the return motion of the lever system, and in connection therewith the slowing up of the motion of the feed-roller J.

Having thus described my invention, I claim as new and desire to secure by Letters Patent—

1. The combination of a supply-hopper, means for supporting said hopper, a cut-off for the supply-hopper, a weighing mechanism provided with a scale-pan having a pocket disposed at one side thereof at the lower part, and auxiliary feeding means separate from and independent of the cut-off of the supply-hopper, said auxiliary feeding means being disposed between the auxiliary supply-hopper and the side pocket and supplying additional material into the side pocket of the scale-pan until the exact weight is reached.

2. The combination of a supply-hopper, means for supporting said hopper, a cut-off for the supply-hopper, a weighing mechanism provided with a scale-pan having a pocket disposed at one side and at the lower part thereof, an automatic discharge-gate extending over the discharge-orifices of both the scale-pan and its pocket, and auxiliary feeding means separate from and independent of the cut-off of the supply-hopper, said feeding means being arranged to supply additional material to the scale-pan until the exact weight is reached.

3. The combination of a supply-hopper, having an auxiliary feed-hopper at one side, means for supporting said hoppers, a cut-off for the supply-hopper independent of the auxiliary feed-hopper, a weighing mechanism provided with a scale-pan, and a feed-roller separate from the hopper and disposed between the auxiliary hopper and the scale-pan, said feed-roller being independent of the cut-off of the supply-hopper for permitting a supply of additional material to the scale-pan from the auxiliary feed-hopper until the exact weight is reached.

4. The combination of a supply-hopper having an auxiliary feed-hopper at one side, means for supporting said hoppers, a cut-off for the supply-hopper, a weighing mechanism provided with a scale-pan having a side pocket, and a feed-roller arranged between the auxiliary feed-hopper and the side pocket of the scale-pan, said feed-roller being independent of the cut-off of the supply-hopper for discharging an additional amount of material into the side pocket until the exact full weight is reached.

5. The combination of a supply-hopper having an auxiliary supply-hopper connected therewith, means for supporting said supply-hoppers, a weighing mechanism provided with a scale-pan having a side pocket, a feed-roller below the auxiliary hopper and above the pocket, means for turning the roller, means for inclosing the space between the auxiliary hopper and the roller, a valve at one side of said space, and means for opening and closing the valve.

6. The combination of a supply-hopper having an auxiliary feeding medium, means for supporting said hopper and feeding medium, a weighing mechanism provided with a scale-pan having a side pocket, a feed-roller having side flanges, means for closing one side of the space between the flanges, a valve for closing the other side of said space, means for operating the valve, and means for rotating the feed-roller.

7. The combination of a supply-hopper having an auxiliary feed-hopper, means for supporting said hoppers, a weighing mechanism provided with a scale-pan having a side pocket, a feed-roller having side flanges, means for closing one side of the space between the flanges, a valve for closing the other side of said space, said valve being pivoted to the auxiliary hopper, an arm extending from the valve, means for actuating the arm of the valve, and means for rotating the feed-roller.

8. The combination of a weighing mechanism having a scale-pan, means for feeding material to the scale-pan, a discharge-gate pivotally supported by the scale-pan, a lever provided with means for supporting the gate in raised position, and with a projecting pin, a second pivoted lever adapted to engage said pin, and means for operating the second lever.

9. The combination of a weighing mechanism having a scale-pan, a pivoted hand-lever, and a main feed-controlling mechanism operated by said hand-lever, and closed by the downward movement thereof, and an auxiliary feed-controlling mechanism opened and closed by the hand-lever.

10. The combination of a weighing mechanism having a scale-pan, a pivoted hand-lever, a main feed-controlling mechanism operated by said hand-lever and closed by the downward movement thereof, an auxiliary feed-controlling mechanism opened and closed by the hand-lever, and a discharge mechanism operated by said hand-lever and opened by the descent thereof.

11. The combination of a weighing mechanism, having a scale-pan, a pivoted hand-lever, a main feed-controlling mechanism operated by said hand-lever, an auxiliary feed-controlling mechanism opened and closed by said hand-lever, and a pneumatic brake connected to said hand-lever for retarding the downward movement thereof and permitting the main and auxiliary feed mechanisms to be brought into operation at the proper times.

12. The combination of a weighing mechanism, having a scale-pan, a pivoted hand-lever, a main feed-controlling mechanism operated by said hand-lever, an auxiliary feed-controlling mechanism opened and closed by the descent of said hand-lever, a discharge mechanism adapted to be opened by the descent of said hand-lever, and a pneumatic brake connected with said hand-lever for retarding the downward movement of said lever and permitting the mechanisms operated by said hand-lever to be brought into operation at the proper times.

13. The combination of a supply-hopper, a weighing mechanism having a scale-pan, a slide guided between the scale-pan and the supply-hopper, a pivoted hand-lever, an arm connected with said hand-lever and adapted to engage and actuate said slide, and a pneumatic brake connected to said hand-lever for retarding the downward movement thereof and of the slide-actuating arm thereby gradually cutting off the material being fed.

In testimony that I claim the foregoing as my invention I have signed my name in presence of two subscribing witnesses.

CARL SCHMIDT.

Witnesses:
 CHAS. H. DAY,
 CARL TELLSCHOW.